(12) United States Patent
Vaccari et al.

(10) Patent No.: US 9,150,316 B2
(45) Date of Patent: Oct. 6, 2015

(54) APPARATUS FOR MODIFIED ATMOSPHERE PACKAGING OF PRODUCTS PLACED IN TRAYS

(75) Inventors: Massimiliano Vaccari, Reggio Emilia (IT); Andrea Schiavina, Correggio (IT)

(73) Assignee: GRUPPO FABBRI VIGNOLA S.p.A., Vignola (IT)

( * ) Notice: Subject to any disclaimer, the term of this patent is extended or adjusted under 35 U.S.C. 154(b) by 549 days.

(21) Appl. No.: 13/522,988

(22) PCT Filed: Jan. 20, 2011

(86) PCT No.: PCT/EP2011/050731
§ 371 (c)(1),
(2), (4) Date: Jul. 19, 2012

(87) PCT Pub. No.: WO2011/092103
PCT Pub. Date: Aug. 4, 2011

(65) Prior Publication Data
US 2012/0285126 A1    Nov. 15, 2012

(30) Foreign Application Priority Data
Jan. 26, 2010 (IT) .............................. BO2010A0045

(51) Int. Cl.
*B65B 31/02* (2006.01)
*B65B 31/04* (2006.01)
(Continued)

(52) U.S. Cl.
CPC .................................... *B65B 31/028* (2013.01)

(58) Field of Classification Search
CPC ...... B65B 31/02; B65B 31/028; B65B 7/164; B65B 31/043; B65B 31/00; B65D 81/2076; B65D 77/12
USPC ..................... 53/510, 79, 403, 432, 433, 556; 426/396
See application file for complete search history.

(56) References Cited

U.S. PATENT DOCUMENTS 5,479,759 A    1/1996  Gorlich et al.
5,689,937 A *  11/1997 Gorlich et al. .................. 53/433
(Continued)

FOREIGN PATENT DOCUMENTS

EP    1 842 776         10/2007
EP    1908689 A2 *      4/2008   ............. B65B 31/02
IT    1 244 845         9/1994

OTHER PUBLICATIONS

International Search Report for PCT/EP2011/050731 Dated Apr. 7, 2011.
(Continued)

*Primary Examiner* — Thanh Truong
*Assistant Examiner* — Praachi M Pathak
(74) *Attorney, Agent, or Firm* — Marvin Petry; Stites & Harbison PLLC

(57) ABSTRACT

Between the two housings each having a recess and below and parallel to the film, there is provided a frame having openings greater in plain view than the underlying trays to be packaged, supported such that, during the closure of the housings the frame interacts with seal and contributes to the formation of a main chamber delimited by the upper edge of the tray and by the film above this edge. Air is removed from these recesses to form the desired level of vacuum therein, while, in the main chamber is isolated from the recesses of the two housings, so that the process gases can be injected directly into the main chamber, while a corresponding quantity of atmospheric air is directed into the recesses to balance the pressures on the opposite faces of the film When the process gases have been fed in, the film is welded to the edge of the tray and is cut outside this edge.

8 Claims, 3 Drawing Sheets

(51) Int. Cl.
  *B65B 31/00* (2006.01)
  *B65B 7/16* (2006.01)
  *B65B 7/28* (2006.01)
  *B65D 81/20* (2006.01)
  *B65D 77/12* (2006.01)

(56) References Cited

U.S. PATENT DOCUMENTS

| | | | | |
|---|---|---|---|---|
| 6,202,388 | B1 * | 3/2001 | Sanfilippo et al. | 53/432 |
| 6,351,928 | B2 * | 3/2002 | Torre | 53/556 |
| 6,912,828 | B1 | 7/2005 | Yamay | |
| 7,600,358 | B2 * | 10/2009 | Natterer | 53/432 |
| 2005/0257501 | A1 | 11/2005 | Natterer | |
| 2008/0104930 | A1 | 5/2008 | Sparakowski | |
| 2013/0036706 | A1 * | 2/2013 | Vaccari et al. | 53/79 |

OTHER PUBLICATIONS

Written Opinion of the Searching Authority for PCT/EP2011/050731 Dated Apr. 7, 2011.

* cited by examiner

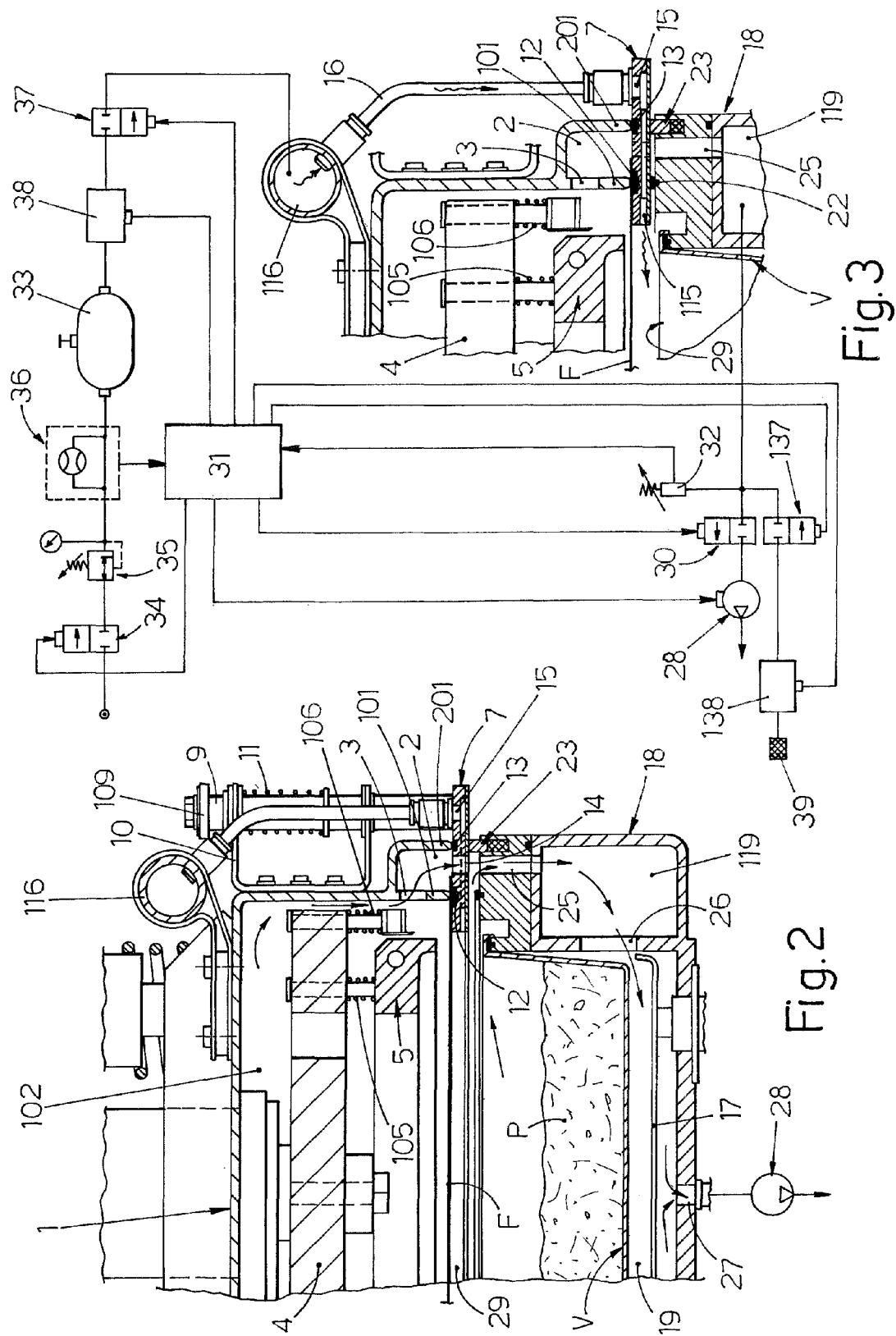

APPARATUS FOR MODIFIED ATMOSPHERE PACKAGING OF PRODUCTS PLACED IN TRAYS

The invention relates to a processing unit or apparatus which welds a sealing film in a gas-tight way on to a tray containing a product to be packaged. The apparatus in question is suitable for packaging machines known as "tray sealers", which weld a film on top of prefabricated trays filled with a product to be packaged, such as a food product. The apparatus according to the invention can produce packages of the type known as MAP (Modified Atmosphere Packages), that is to say packages in which the product is enclosed in a gas-tight package containing a modified atmosphere which helps to preserve the product. In order to modify the atmosphere, in a step in which the product placed in the tray is covered by the sealing barrier film, which is kept suitably distant from the perimetric edge of the tray, air is initially removed from inside the tray and is then replaced with a modified atmosphere, such as an atmosphere based on nitrogen, carbon dioxide, oxygen and/or other gases. For the implementation of this process in the prior art, the trays containing the products are housed in a lower housing which is open at the top, the edges of the trays bearing on the edge of the seat containing the trays. Means are provided for positioning the trays above the lower housing, for introducing them into this housing, and for extracting them at the end of the cycle, to enable them to be removed and replaced with new trays to be sealed. An upper housing is located above, and aligned with, the lower housing, and the film from which portions are taken for sealing the trays placed beneath it passes under the upper housing. When the trays have been positioned above the lower housing, the two housings are made to close on to each other and on to the film, which divides the inner spaces of the two housings from each other, and which is suitably raised above the edges of the trays, in such a way that the inner space of the trays filled with products communicates with the inner space of the lower housing. In the packaging cycle, the inner spaces of the two housings are connected to a vacuum source, in order to remove air from inside the trays through the lower housing and balance the counter-pressure on the film through the upper housing, in such a way that the film remains raised and separated from the trays. In the next step, the inner volume of the lower housing is separated from the suction circuit and is connected to a source for the progressive feed of the modified atmosphere, while the inner volume of the upper housing is connected to means for progressive pressurization, in such a way that the pressures acting above and below the film are kept, for example, at equal levels. The modified atmosphere is usually introduced into the lower housing until the pressure reaches the level of atmospheric pressure, and the upper housing is connected to a circuit which gradually connects it to the atmosphere. When the process gases have been introduced into the lower housing and then through this into the trays, at least the lower circuit for supplying the treatment gases is closed, and means located in the upper housing operate at the correct time by descending and interfering with the film in order to heat-weld it in a sealed way on to the edges of the trays and subsequently cut and separate the portion of film welded on to each tray from the remainder of the film which is connected to a reel for collecting the waste film. In the next step, the two housings open by moving away from each other, the packaged trays are extracted from the lower housing and are removed and replaced with new trays, the film advances by one step to remove the waste film and position new intact film over the new trays, and the cycle which has been described is repeated.

In other cases, the inner spaces of the two housings are connected to separate circuits, so that the film can be treated through the upper housing so as to give it an upwardly convex shape, which is particularly suitable for application to trays where there is an overflow of the product to be packaged. The vacuum is initially created through the circuit of the lower housing and the process gas for preserving the product is then injected. An example of this solution is described in US patent application 2005/0257501 published on Nov. 24, 2005, entitled: "Method and packaging machine for packaging a product arranged in a tray".

A similar method is described in Italian patent no. 1 244 845 of Nov. 22, 1990, entitled: "Packaging machine for sealing containers".

The main problem encountered with prior art tray sealers is that a large quantity of process gas, which is cyclically injected into the trays through the inner volume of the lower housing, remains in this housing and is then dispersed into the surrounding air at the end of the cycle when the housings are opened. This has a significant effect on packaging costs, since the price of process gases is considerable, and it also complicates the machine because the dispersion of process gases into the environment has to be prevented by the use of suction hoods. It would be possible to overcome this problem by reducing the inner volume of the lower housing to a minimum, by adapting the housing to the shape of the trays on each occasion, for example by introducing filling pieces into the lower housing and changing these when the dimensions and/or depth of the trays varies. However, this solution does not entirely resolve the problem, since it still leaves an empty space which is required for the flow of fluids and which limits the flexibility of the machine. An example of this solution is described in U.S. Pat. No. 5,479,759 published on Jan. 2, 1996, entitled: "Method and apparatus for packaging food".

According to another proposal, a lower housing could be made with a movable base which would interact in a sealed way with the lateral wall of the housing and which could be made to rise or descend to adapt easily, rapidly and automatically on each occasion to the variations of shape and/or size of the trays used, but even this solution cannot provide a complete solution to the problem, and it also inevitably complicates the construction and operation of the machine for various reasons, including the evident problems of sealing.

With machines of the known type, it is not possible to operate in a selective and different way on groups of trays inserted between the opposing housings for treatment, welding and cutting, for the purpose of carrying out different internal treatment procedures, for example by introducing different gases. The invention is intended to overcome these and other drawbacks of the known art with a machine as described in the appended claim 1, based on the following idea for a solution. The means forming said opposing housings, between which the trays containing the products and the film above them are inserted, are made in such a way that, in a first stage of the closure of the housings, the film is retained by portions whose extension is greater than the plan of the edges of each tray, and the chambers inside the upper and lower housings communicate with each other and with the inner spaces of the trays, in such a way that this whole circuit can be connected to the means for creating a vacuum in the trays. In the next step, said portions of film are brought towards the trays, but without sealing them, so as to form a main chamber of very small volume within the trays, which is separated from the inner chambers of the two housings and which is partly delimited by at least one component which has portions close to the edges of the trays and in which suitably distributed internal passages are formed, each of these passages having one end opening into said main chamber while its other end is connected to a process gas supply circuit. The process gases are then injected directly through this circuit into said main chambers, and therefore directly into the trays, while the inner chambers of the two housings are gradually pressurized by a connection to the atmosphere, as is done in the prior art in the upper housing only. When the treatment of the trays is complete, the operating cycle continues in the conventional way, with the execution of the steps of heat-welding and cutting. Clearly, when the two housings are opened, both of their inner chambers are at atmospheric pressure, and the considerable dispersion of process gases which occurs in the prior art does not happen here, since the small quantity of process gas supplied to the trays has been entirely trapped in the small internal spaces of the trays which are sealed by their covers. The circuits connected to said main chambers can be used to carry out selective and, if required, differentiated treatments of groups of trays which are placed between the pairs of opposing housings from time to time.

Further characteristics of the invention, and the advantages resulting therefrom, will be made clearer by the following description of a preferred embodiment of the invention, illustrated purely by way of non-limiting example in the figures on the attached sheets of drawings, in which:

FIG. 2 shows part of the two housings shown in the sectional view of FIG. 1, in the closed position and in the step of vacuum formation for the removal of air from inside the tray;

Figure 5:
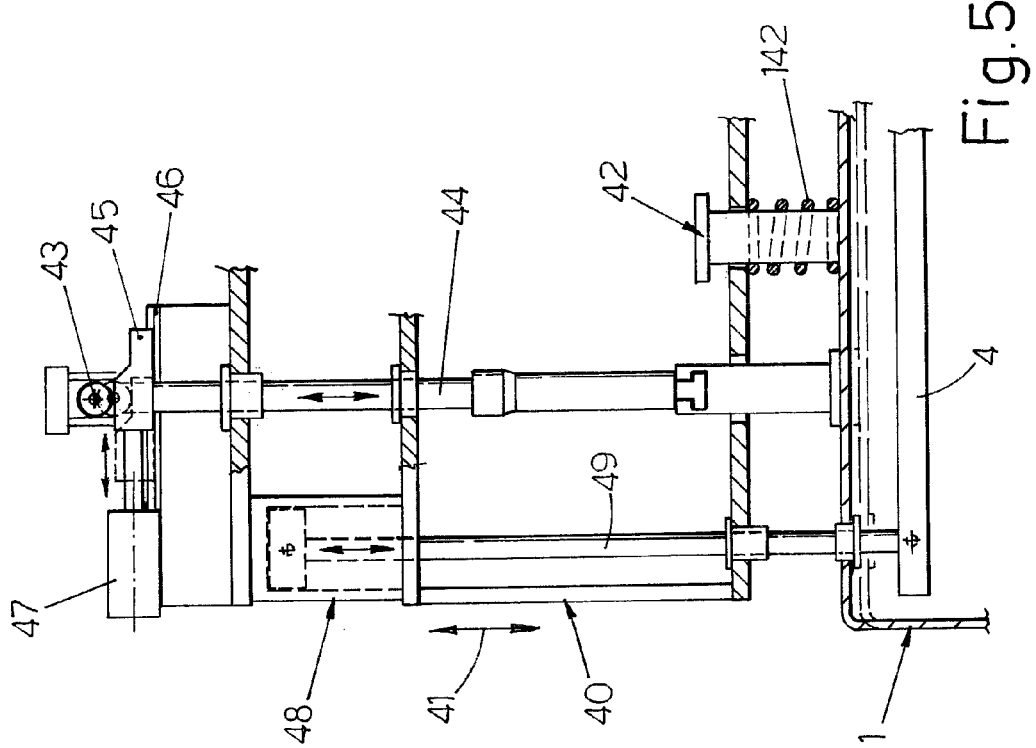
Figure 4:
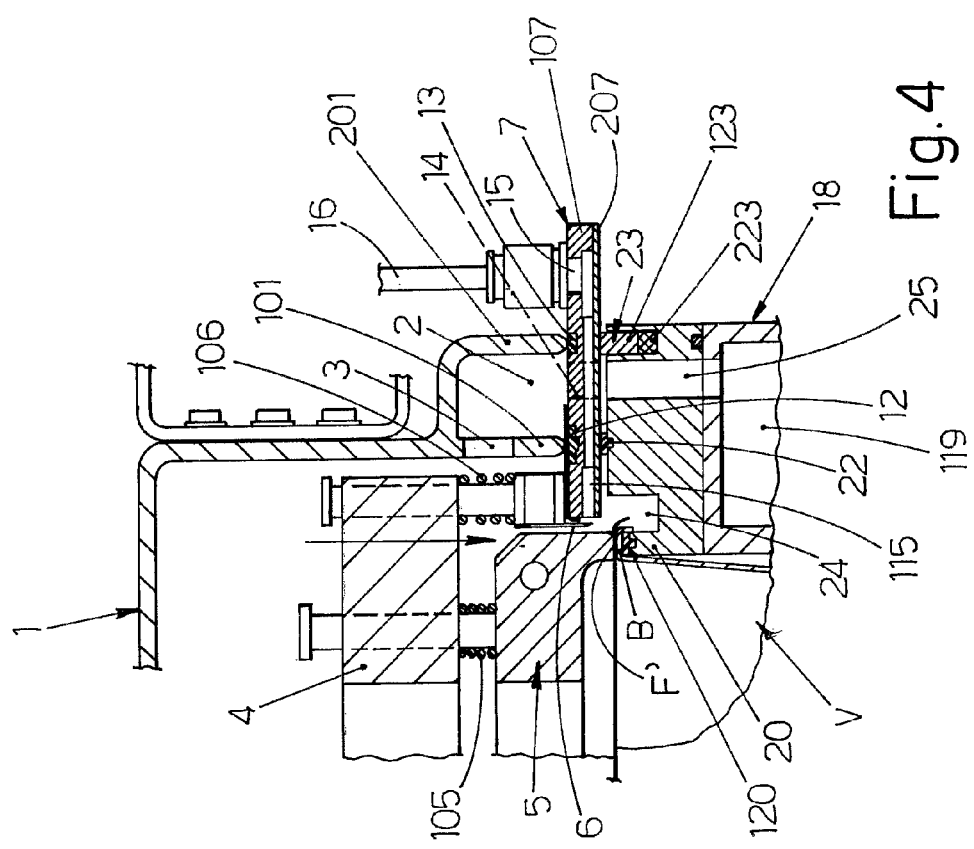

FIG. 3 is a sectional view of part of the two housings, again in the closed position and in the subsequent step of introduction of the process gases into the tray, this drawing providing a schematic illustration of a possible embodiment of the external circuit which controls the injection of the process gases into the tray and which gradually and proportionally pressurizes the inner chambers of the two housings;

FIG. 4 is a sectional view of part of the two housings in the closed position and in the final stage of welding and cutting along the perimeter of the tray sealing film;

FIG. 5 is a schematic illustration, in lateral elevation and in partial section, of details relating to the means for the vertical movement of the upper housing.

Figure 1:
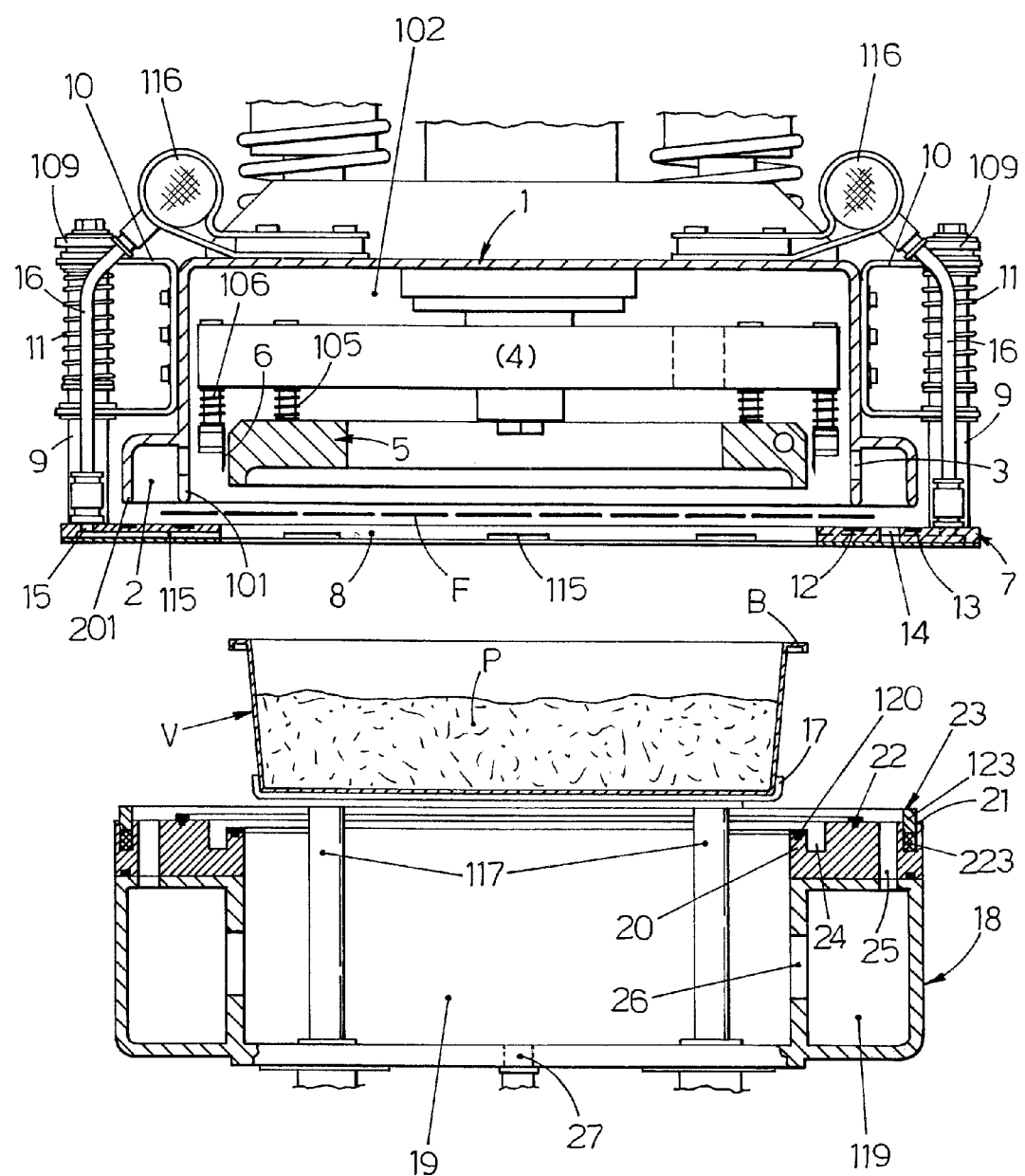
FIG. 1 is a lateral view in partial section of a simplified embodiment of the apparatus with the two housings shown in the open position, and with the film and a tray filled with product to be sealed positioned between the housings.

In FIG. 1, the number 1 indicates the upper housing which has in its lower part an inner edge 101 and an outer edge 201 which surrounds said inner edge and which forms, in conjunction with the inner edge, an annular chamber 2 which communicates, through apertures 3 suitably distributed along the inner edge 101, with the inner volume of the housing 1, which is connected to suitable means for vertical guiding, raising and lowering, as described below. Within the housing 1 there is a plate 4 of a known type connected to special means for selective raising and lowering, described below, which, by means of interposed guide and spring means 105 and 106, support beneath them the heat-welding unit 5 and the cutting unit 6 which surrounds the welding unit 5 and is normally retracted with respect to the latter. Under the upper housing 1, at a suitable distance from its edges 101 and 201 and parallel to the theoretical plane on which these edges lie, there is a strong frame 7 which has an opening 8 whose shape and dimensions are related to and suitably greater than those of the trays to be sealed, this frame being supported by means of vertical guide bars 9 on supports 10 fixed outside the housing 1, resilient means 11 being provided to push the guide bars 9 downwards in such a way that their ends 109 normally bear on the tops of said supports 10. The upper face of the frame 7 has annular tracks 12 and 13 facing the edges 101 and 201 of the upper housing, these tracks comprising any material capable of interacting in a sealed way with these edges and with the film when the housing 1 and the frame 7 are made to move towards each other, as described below. The portion of the frame 7 between said sealing tracks 12 and 13 has apertures 14 which pass through its thickness and which are vertically aligned with the annular chamber 2 of the upper housing 1. The frame 7 is also characterized in that it has orifices 115 on its edge delimiting the opening 8, these orifices being connected to ducts 15 within the frame which are in turn connected to flexible external ducts 16, terminating in manifolds 116 connected to the process gas supply circuit, a non-limiting exemplary embodiment of which is described below. Said orifices 115 and the corresponding ducts 15 can be formed, for example, by milling on at least one of the inner faces of the superimposed plates 107 and 207 which form the frame 7 and which are fixed together in a sealed way.

The heat-welding film F passes between the lower edge 101 of the housing 1 and the frame 7, and is used to seal the preformed trays V filled with product P, the trays being placed by any suitable means under the frame 7 and accurately centred with respect to its opening 8, this procedure being assisted by the fact that the trays bear on known extractors 17 associated with the lower housing by corresponding guide means 117. The lower housing 18 is connected to suitable raising and lowering means which are known and which are therefore not shown in detail. The lower housing 18 is provided with a chamber 19 of suitable shape and size to house the extractor 17 together with the tray V when the housing is raised (see below), and the upper part of this chamber is delimited by an edge 20 with a non-stick gasket 120 on which the edge B of the tray V is intended to bear. At a level above that of the edge 20, the lower housing 18 has a flat surface 21 with annularly continuous gaskets 22 and 23, aligned with and facing the edges 101 and 201 of the upper housing 1. The outer gasket 23 normally projects further than the gasket 22 and can be made in composite form, with an outer part 123 of hard material and an inner part 223 of soft material, such that the whole assembly forms a gasket which can be subjected to considerable deformation in respect of its height (see below). It is to be understood that the scope of the invention also includes the variant in which the gasket 23 is a simple gasket placed on an annular body mounted slidably and in a lateral sealed way on the lower housing 18 and normally kept by resilient means and/or other suitable means in a projecting position with respect to the flat surface 21 with the gasket 22.

Between the edge 20 and the flat surface 21 there is an annular recess 24 with suitable characteristics, while the portion of the flat surface 21 lying between said gaskets 22 and 23 has vertical apertures 25 communicating with the underlying gap 119 which is connected to the chamber 19 through lateral apertures 26. The chamber 19 has an opening 27 which can be connected to the circuit for creating a vacuum, shown schematically as a pump 28 in FIG. 2.

The machine as described operates in the following way. When the tray V has been positioned on the extractor 17, the lower housing 18 is raised and the upper housing 1 is lowered, as shown in FIG. 2. The tray V is inserted into the chamber 19 and its edge B bears on the supporting edge 20, 120 of the lower housing, while the frame 7 bears in a sealed way on the lower gasket 23 and the lower edges 101 and 201 of the upper housing 1 interact with the gaskets 12 and 13 of the frame 7 and with the interposed film F. In this condition, the system forms a main chamber 29 formed by the inner surface of the tray V containing the product P and by the film F placed above it, this chamber communicating, through the free space between the lower face of the frame 7 and the upper flat surface 21 of the housing 18, with the chambers and apertures 14, 102, 25, 119, and 19. Consequently, when the suction means 28 are actuated, the air contained in said inner circuit 14, 102, 25, 119, 19 is evacuated and the desired degree of vacuum is formed in said chamber, without altering the position of the film F, since this is subjected to identical degrees of vacuum on both its upper face (from the chamber 102) and its lower face (from the chamber 29). In the next step, as shown in FIG. 3, the assembly formed by the upper housing 1 and the frame 7 is lowered until the frame 7 comes into contact with the lower gasket 22 as well, thus isolating the main chamber 29 and the inner space of the tray V from the vacuum circuit along its immediate periphery, so that it now communicates solely with the orifices 115 of the frame 7. The vacuum circuit is closed by stopping the pump 28 and closing the valve 30, these operations being executed by the processor 31 which detects the degree of vacuum present in the apparatus by means of the vacuum switch 32. In FIG. 3, the number 33 indicates, by way of example, the reservoir for the process gases which can be accumulated therein by opening the valve 34, the gases flowing through a pressure regulator 35 and a flow rate meter 36 which sends the necessary information on this function to the processor 31. When the vacuum circuit is closed, the processor 31 causes a valve 37 to open and actuates a modulated valve 38 which progressively injects the process gases, through the circuit 116, 16, 15 and 115, into the main chamber 29 and then directly into the tray V. At the same time, the processor 31 causes the valve 137 to open and actuates a modulated valve 138 connected, for example, to the atmosphere through a filter 39, in such a way that, while the process gas enters the main chamber 29, a corresponding quantity of air from the atmosphere enters the chamber 19 and the inner circuit of the system communicating with the upper housing 102 as a result of the signals from the vacuum switch 32, in such a way that the film F is subjected to equal pressure levels above and below. When the pressure of the process gases in the main chamber 29 becomes equal to atmospheric pressure, the chamber 19 is also at atmospheric pressure, and, when this condition has been reached, the solenoid valves 37 and 137 are closed and the modulating valves 38 and 138 are inactivated at the correct time, and the known step of FIG. 4 is executed, by lowering the plate 4 which causes the welding head 5 to push the film F on to the edge B of the tray V and weld it there, and then causes the cutting means 6 to separate the portion of film F' which has been heat-welded on to the tray from the outer waste portion of the film F. In this step, the process gases which were previously supplied to the main chamber 29 are sealed inside the tray V which is closed at its top by the portion of film F'. After the step of FIG. 4, the two housings are moved away from each other, as shown in FIG. 1, and the sealed tray V is extracted from the lower housing 18 by the extractor 17 and returns in the correct state to be removed and replaced by a new tray to be sealed, while the film F is advanced so that an intact portion thereof is placed above the new trays and the portion used in the preceding cycle is transferred to collecting means of a known type. Clearly, the apparatus according to the invention can be used to prevent unnecessary consumption of process gas, since the gas is supplied directly into the tray through a small dedicated circuit such as the circuit of the main chamber 29, instead of being supplied through the inner chamber or chambers of the lower housing 18, as is the case in the prior art.

The scope of the invention also includes the variant (not shown) in which the process gases are supplied to the main chamber 29 through a circuit including orifices in the annular recess 24 of the lower housing, this method being evident to persons skilled in the art and easily applied by them.

In a possible embodiment of the invention, the upper housing can be controlled in its vertical movements by the means shown schematically in FIG. 5. The housing 1 is fixed to a composite structure 40, which can be lowered and raised by suitable means as indicated by the arrow 41, with interposed vertical guide means 42 and corresponding resilient means 142 which normally keep the housing 1 at a maximum predetermined distance from the lower part of the structure 40, and ensure that rollers 43, which are mounted on the upper end of composite vertical rods 44 (the apparatus has a plurality of rods 44), which are fixed at their lower ends to the housing 1 and which pass in a guided and slidable way through the structure 40, interact with corresponding linear cams 45 which are slidable on guide means 46 orthogonal to the rod 44 and fixed to the structure 40, each cam 45 being connected to an actuator 47 which, on command, can move the cam 45 from the position shown in solid lines to that shown in broken lines, and vice versa. When the housings move towards each other as a result of the step of FIG. 2, the upper housing 1 is raised slightly and the guide bars 42 and the rod 44 are also raised, this movement being detected by suitable sensors (not shown) which cause the lowering of the structure 40 to stop. The cams 45 are placed in the position shown in solid lines, to keep the rollers 43 of each rod 44 in the upper position. During the formation of the vacuum in the housings 1 and 18, as described with reference to FIG. 2, the cam 45 and the roller 43 oppose the considerable downward force to which the upper housing 1 is subjected by the difference between external atmospheric pressure and the vacuum created in the housings 1 and 18. When the vacuum has been created, the housing 1 can be lowered to the condition shown in FIG. 3, simply by retracting the cams 45 into the position shown in broken lines, in such a way that the housing 1 moves from the position shown in solid lines to that shown in broken lines. FIG. 5 shows that the structure 40 has cylinder and piston units 48 mounted on it, these units acting by means of bars 49 which can slide through the structure 40 and the housing 1 to impart the necessary vertical movements to the plate 4 with the welding means 5 and the cutting means 6 described with reference to the preceding figures.

It is to be understood that the embodiment illustrated in the drawings is a simplified embodiment of the apparatus, which in reality may be designed to act simultaneously on a plurality of lines of trays and on more than one tray in each line, with the possibility of supplying process gases which may have different characteristics through the two lateral manifolds 116 to the lines of trays which are cyclically treated, the whole arrangement being easily understood and produced by persons skilled in the art.

The invention claimed is:

1. An apparatus for the modified atmosphere packing of products placed in trays, comprising:
opposing housings including a downwardly open upper housing having an upper recess containing a welding structure and a cutter to weld and cut a barrier film to seal the film onto the trays, and an upwardly open lower housing having a lower recess which receives trays, which trays are movable into and out of the lower recess,
a structure to position a stretched portion of the film between the two housings and above trays, and a structure to bring said opposed housings towards each other to clamp them between the edges of a tray and the film, which film is located above the edges of the tray, and including a structure to extract air from a tray and subsequently inject processed gases into the tray before the film is welded onto the edge of the tray and subsequently cut along the perimeter of the portion of the film welded to the tray, a frame located between the two opposed housings and below and parallel to the film, the frame having openings located outwardly from the outer periphery of the tray, such that during closure of the housings against each other the frame is sealed against the lower housing to form a main chamber delimited by the upper edge of the tray and by the film located above said upper edge, said main chamber being initially connected to the recesses of the two opposed housings to provide a passage to remove air from these recesses and form a vacuum therein, and to subsequently isolate the main chamber from the said recesses so that the process gases can be injected directly into the main chamber through a dedicated circuit connected thereto while atmospheric pressure is directed into said recesses to apply equal pressure on opposite sides of the film before the film is welded to the edge of the tray after which the film is cut outside of the edge by the cutter such that after sealing and cutting, when the opposed housings are separated from each other, no more than minimal quantities of processed gases are released into the atmosphere, wherein annular seals are provided to form a sealed connection between the upper face of the frame and the lower edges of the upper housing with the film interposed therebetween, and wherein the frame interacts with seals which are located on and circumscribe the perimeter of the lower housing, the arrangement being such that a lower face of the frame, together with the portion of the film lying above the edge of the tray form said main chamber which communicates through said openings with both the upper and lower recesses such that air can be extracted from the main chamber by its connection to at least one of the upper and lower recesses, while avoiding undesired deformation of the film.

2. An apparatus according to claim 1, comprising a structure to bring the two opposed housings closer to each other after the air has been extracted, to cause the interposed frame to interact with a first annular seal on the lower housing which is positioned outside of the lower recess and circumscribed by a second annular seal such that the space between the first and second seals communicates with the two recesses, while the main chamber is isolated from said recesses, making it possible to introduce the process gases into the main chamber through at least one of the structures which delimit the perimeter of the main chamber, while atmospheric air is directed into the recesses of the two housings.

3. An apparatus according to claim 1, wherein the seals with which the lower face of the frame interacts is of a type which can undergo considerable deformation in the vertical direction.

4. An apparatus according to claim 1, wherein the frame is supported by a structure fixed laterally to the upper housing and biased in the closing direction by a spring.

5. An apparatus according to claim 1, wherein the upper and lower housings are designed to simultaneously act upon a plurality of lines of trays and on more than one tray in each line while supplying processed gases having different characteristics supplied through lateral manifolds to the lines of trays.

6. An apparatus for the modified atmosphere packing of products placed in trays, comprising:
    opposing housings including a downwardly open upper housing having an upper recess containing a welding structure and a cutter to weld and cut a barrier film to seal the film onto the trays, and an upwardly open lower housing having a lower recess which receives trays, which trays are movable into and out of the lower recess,
    a structure to position a stretched portion of the film between the two housings and above trays, and a structure to bring said opposed housings towards each other to clamp them between the edges of a tray and the film, which film is located above the edges of the tray, and including a structure to extract air from a tray and subsequently inject processed gases into the tray before the film is welded onto the edge of the tray and subsequently cut along the perimeter of the portion of the film welded to the tray,
    a frame located between the two opposed housings and below and parallel to the film, the frame having openings located outwardly from the outer periphery of the tray, such that during closure of the housings against each other the frame is sealed against the lower housing to form a main chamber delimited by the upper edge of the tray and by the film located above said upper edge, said main chamber being initially connected to the recesses of the two opposed housings to provide a passage to remove air from these recesses and form a vacuum therein, and to subsequently isolate the main chamber from the said recesses so that the process gases can be injected directly into the main chamber through a dedicated circuit connected thereto while atmospheric pressure is directed into said recesses to apply equal pressure on opposite sides of the film before the film is welded to the edge of the tray after which the film is cut outside of the edge by the cutter such that after sealing and cutting, when the opposed housings are separated from each other, no more than minimal quantities of processed gases are released into the atmosphere, and
    including fluid circuits formed in said frame, one end of each circuit terminating in openings on the inner edge of the frame and the other end being connected to ducts terminating at manifolds which are supported by the upper housing and are connected to a supply of process gases to supply such process gases at predetermined times.

7. An apparatus for the modified atmosphere packing of products placed in trays, comprising:
    opposing housings including a downwardly open upper housing having an upper recess containing a welding structure and a cutter to weld and cut a barrier film to seal the film onto the trays, and an upwardly open lower housing having a lower recess which receives trays, which trays are movable into and out of the lower recess,
    a structure to position a stretched portion of the film between the two housings and above trays, and a structure to bring said opposed housings towards each other to clamp them between the edges of a tray and the film, which film is located above the edges of the tray, and including a structure to extract air from a tray and subsequently inject processed gases into the tray before the film is welded onto the edge of the tray and subsequently cut along the perimeter of the portion of the film welded to the tray,
    a frame located between the two opposed housings and below and parallel to the film, the frame having openings located outwardly from the outer periphery of the tray, such that during closure of the housings against each other the frame is sealed against the lower housing to form a main chamber delimited by the upper edge of the tray and by the film located above said upper edge, said main chamber being initially connected to the recesses of the two opposed housings to provide a passage to remove air from these recesses and form a vacuum therein, and to subsequently isolate the main chamber from the said recesses so that the process gases can be injected directly into the main chamber through a dedicated circuit connected thereto while atmospheric pressure is directed into said recesses to apply equal pressure on opposite sides of the film before the film is welded to the edge of the tray after which the film is cut outside of the edge by the cutter such that after sealing and cutting, when the opposed housings are separated from each other, no more than minimal quantities of processed gases are released into the atmosphere, and wherein a process gas supply circuit is formed in a surface of the lower housing which carries a support for the edges of the tray, and said circuit opens into an angular recess which circumscribes the said tray edges and into which the cutter is inserted.

8. An apparatus for the modified atmosphere packing of products placed in trays, comprising:

opposing housings including a downwardly open upper housing having an upper recess containing a welding structure and a cutter to weld and cut a barrier film to seal the film onto the trays, and an upwardly open lower housing having a lower recess which receives trays, which trays are movable into and out of the lower recess, a structure to position a stretched portion of the film between the two housings and above trays, and a structure to bring said opposed housings towards each other to clamp them between the edges of a tray and the film, which film is located above the edges of the tray, and including a structure to extract air from a tray and subsequently inject processed gases into the tray before the film is welded onto the edge of the tray and subsequently cut along the perimeter of the portion of the film welded to the tray, a frame located between the two opposed housings and below and parallel to the film, the frame having openings located outwardly from the outer periphery of the tray, such that during closure of the housings against each other the frame is sealed against the lower housing to form a main chamber delimited by the upper edge of the tray and by the film located above said upper edge, said main chamber being initially connected to the recesses of the two opposed housings to provide a passage to remove air from these recesses and form a vacuum therein, and to subsequently isolate the main chamber from the said recesses so that the process gases can be injected directly into the main chamber through a dedicated circuit connected thereto while atmospheric pressure is directed into said recesses to apply equal pressure on opposite sides of the film before the film is welded to the edge of the tray after which the film is cut outside of the edge by the cutter such that after sealing and cutting, when the opposed housings are separated from each other, no more than minimal quantities of processed gases are released into the atmosphere, and wherein the upper housing is mounted on a vertically moveable support structure having springs biasing the vertical rods to a closed position, upper rollers interacting with cams which are slidable on guides orthogonal to the rods, the rods being moveable under the action of actuators from a raised position in which the apparatus is prepared for the formation of a vacuum in the recesses of the upper and lower housings to a lowered position whereat process gases are injected into the main chamber.

\* \* \* \* \*